Nov. 13, 1928.

H. A. TOWNSEND

AUTOMATIC ENSILAGE DISTRIBUTOR FOR SILOS

Original Filed Jan. 15, 1926  2 Sheets-Sheet 1

Inventor
H. A. Townsend
By
Attorney

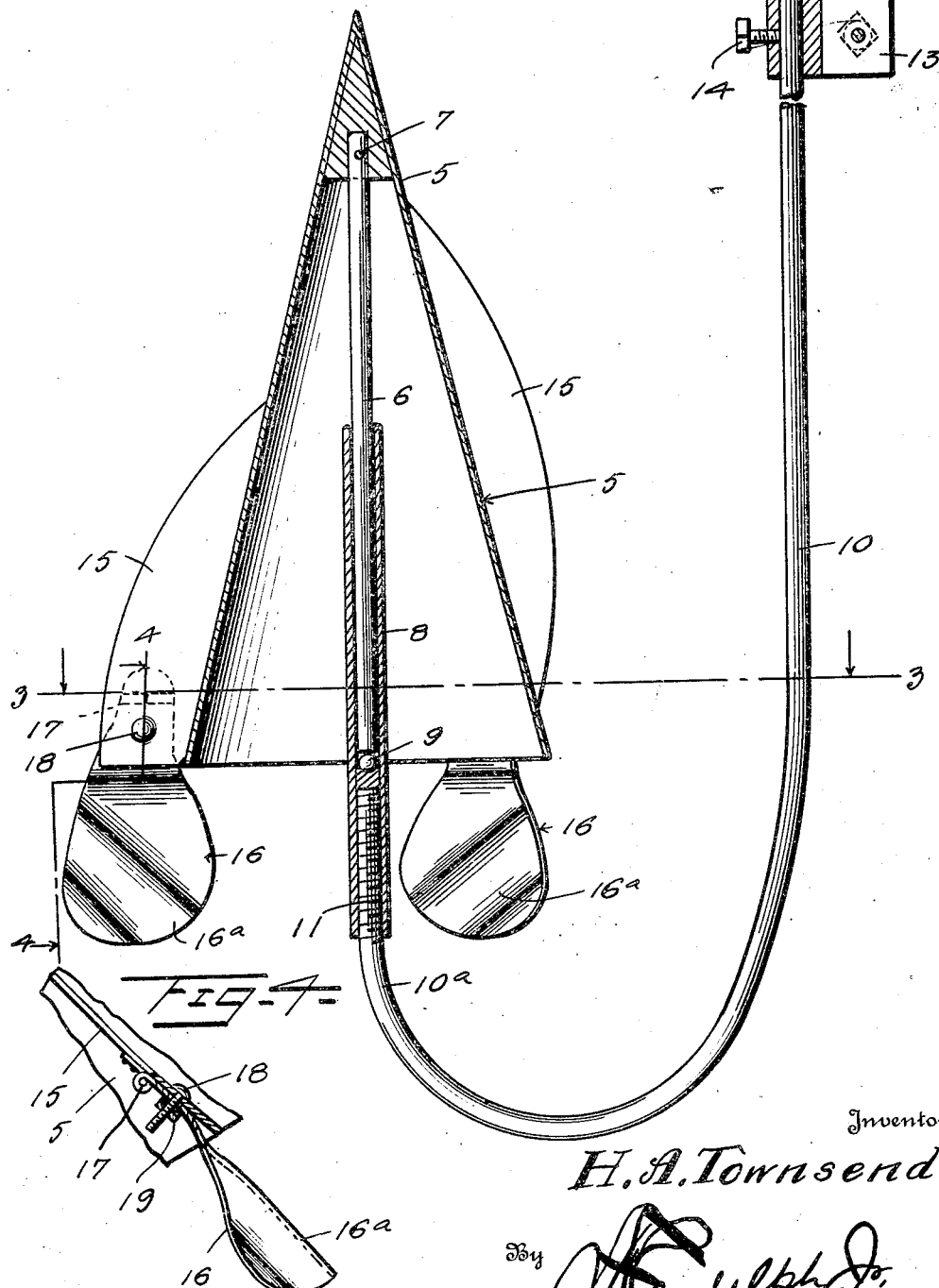

Patented Nov. 13, 1928.

1,691,683

UNITED STATES PATENT OFFICE.

HERBERT A. TOWNSEND, OF STOCKTON, ILLINOIS.

AUTOMATIC ENSILAGE DISTRIBUTOR FOR SILOS.

Application filed January 15, 1926, Serial No 81,495. Renewed April 12, 1928.

This invention relates to silos, and has for one of its objects the provision of a novel and simple means for effecting an even horizontal distribution of the ensilage as it is deposited in the silo.

A further object of the invention is the provision of an ensilage distributor which will be rotatably supported and so constructed that the ensilage being deposited in the silo will operate the same in order to effect the distribution of the ensilage.

With the foregoing and other objects in view, the invention consists of the novel construction, combination and arrangement of parts hereinafter fully described and claimed, and illustrated in the accompanying drawings, wherein:

Figure 1 is a sectional view illustrating the application of an ensilage distributor embodying my invention, Figure 2 is a detail sectional view of the ensilage distributor, the section being taken on a plane extending vertically and centrally through the distributor, Figure 3 is a horizontal sectional view taken on the plane indicated by the line 3—3 of Figure 2, Figure 4 is a detail sectional view taken on the planes indicated by the line 4—4 of Figure 2, and Figure 5 is a similar view illustrating the manner in which the spreading elements may be adjusted and secured in adjusted position with respect to the impelling elements.

Corresponding and like parts are referred to in the following description, and designated in the several views of the accompanying drawings, by similar reference characters.

In the drawings, 1 designates the upper portion of the side wall, and 2 the roof of a silo. 3 designates the conveyor pipe of the means by which the ensilage is deposited in the silo, and 4 the discharge end or spout of the pipe 3.

The distributor comprises a conical body or spreader 5 which is adapted to be rotatably supported with its apex in a central position with respect to the discharge opening of the spout 4. The spreader 5 is preferably hollow, and is provided with a shaft 6 which is axially arranged therein. The upper end of the shaft 6 is secured as at 7 to the body 5, and the lower portion thereof is rotatably received by an upright sleeve or elongated bearing 8. The lower end of the shaft 6 rests on an anti-friction ball 9 supported within the lower portion of the bearing 8, and said bearing is adapted to contain a lubricant. A bar 10 is secured to and depends from the pipe 3, and its lower portion is bent upwardly and screw threaded as shown at 11, and to such portion the lower end of the bearing 8 is secured. A strap 12 is secured to the pipe 3, and carries a bracket 13 in which the upper end of the rod 10 is adjustable vertically to permit the spreader 5 to be arranged at the required distance from the discharge end of the spout 4. The rod 10 is secured in adjusted position by a set screw 14.

Spiral impeller blades 15 are secured to the spreader 5, and extend from points adjacent the upper end of the spreader to the lower end thereof. Scattering blades 16 are pivoted as at 17 to the impeller blades 15. The hinges 17 are positioned at the forward sides of the blades 15, and the blades 16 extend below the lower ends of the body 5 and blades 15. The blades 16 have downwardly and inwardly inclined curved portions $16^a$, and are supported in a substantially parallel position with respect to the blades 15 by means of a bolt 18 and nut 19. If desired the blades 16 may be supported in a forwardly inclined position with respect to the blades 15 by the elements 19, and this adjustment may be effected by placing washers $18^a$ of the required thickness on the elements 18 between the blades 15 and 16, as suggested in Figure 5. The scattering blades 16 extend outwardly from the spreader 5.

In practice, the ensilage discharged into the silo will travel down the spreader 5 in contact with the rear sides of the blades 15. The downward movement of the ensilage in contact with the blades 15, will, due to the spiral arrangement of the blades, rotate the spreader 5 and blades 16 from right to left. The conical formation of the part 5, and the spiral arrangement of the blades 15, will spread the ensilage during its passage from the upper to the lower end of said part. As the ensilage passes below the spreader 5 and blades 15, the blades 16 contact with the same and direct a small portion thereof into the center of the silo and the remainder thereof outwardly from the center of the silo. The amount of ensilage directed into the center of the silo may be regulated and controlled by adjusting the blades 16 angularly with respect to the blades 15. The spreader 5 and associated parts may freely rotate due to the fact that the bearing 8 is adapted to contain oil and to the fact that the shaft 6 rests on the anti-friction ball 9. The spreader 5 and associated parts may be readily applied or removed and readily adjusted into proper position with respect to the discharge end of the spout 4.

From the foregoing description, taken in connection with the accompanying drawings, the advantages of the construction and of the method of operation will be readily apparent to those skilled in the art to which the invention appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. An ensilage distributor comprising a spreading element, impelling elements secured to the spreading element, scattering elements pivoted to the impelling elements, and elements for supporting the scattering elements in different positions with respect to the impelling elements.

2. An ensilage distributor comprising an upright sleeve, a bearing within the lower portion of the sleeve, a shaft having its lower portion positioned in the sleeve and resting upon the bearing, a hollow spreading member secured to the shaft and extending below and surrounding the upper end of the sleeve, and impelling elements secured to the spreading member.

In testimony whereof I affix my signature.

HERBERT A. TOWNSEND.